(12) United States Patent
Pitcher

(10) Patent No.: US 11,351,481 B1
(45) Date of Patent: Jun. 7, 2022

(54) SAND DISCHARGE CONTROL SYSTEM

(71) Applicant: Jason Pitcher, Spring, TX (US)

(72) Inventor: Jason Pitcher, Spring, TX (US)

(73) Assignee: North American Automation, LLC, Spring, TX (US)

( * ) Notice: Subject to any disclaimer, the term of this patent is extended or adjusted under 35 U.S.C. 154(b) by 0 days.

(21) Appl. No.: 17/362,234

(22) Filed: Jun. 29, 2021

(51) Int. Cl.
| | |
|---|---|
| *B01D 21/00* | (2006.01) |
| *B01D 21/24* | (2006.01) |
| *E21B 43/34* | (2006.01) |
| *G05D 7/06* | (2006.01) |
| *B01D 21/30* | (2006.01) |
| *B01D 21/34* | (2006.01) |

(52) U.S. Cl.
CPC ......... *B01D 21/34* (2013.01); *B01D 21/0024* (2013.01); *B01D 21/245* (2013.01); *B01D 21/302* (2013.01); *G05D 7/0652* (2013.01); *E21B 43/35* (2020.05)

(58) Field of Classification Search
CPC ..... B01D 21/245; B01D 21/302; B01D 21/34
See application file for complete search history.

(56) References Cited

U.S. PATENT DOCUMENTS

| | | | | |
|---|---|---|---|---|
| 2014/0345727 | A1* | 11/2014 | Gilmore | E21B 21/01 137/624.21 |
| 2019/0118118 | A1* | 4/2019 | Sehsah | B01D 21/0009 |
| 2021/0077923 | A1* | 3/2021 | Carlson | B01D 21/245 |
| 2021/0252431 | A1* | 8/2021 | Malone | G01F 15/08 |

FOREIGN PATENT DOCUMENTS

WO  WO-2019241326 A1 * 12/2019 ............. E21B 43/34

* cited by examiner

*Primary Examiner* — Bradley R Spies
(74) *Attorney, Agent, or Firm* — Bushman Werner, P.C.

(57) ABSTRACT

A system for controlling sand discharge from a plurality of sand separators each of which has a dump line and an actuated valve apparatus in the dump line. There is a first controller which is operatively connected to the actuated valve assemblies and is configured to open one of the actuated valve assemblies in response to a parameter such as internal pressure in the sand separator. There is a second controller which is connected to the first controller and which is also connected to an actuated discharge valve in a common discharge line to which all of the dump lines are connected. On a command from the first controller to the second controller that a selected one of the actuated valve assemblies is opening, the second controller opens the discharge valve.

8 Claims, 2 Drawing Sheets

SAND DISCHARGE CONTROL SYSTEM

FIELD OF THE INVENTION

The present relates to sand separators or desanders used in oil and gas production and, more particularly to controlling the operation of multiple sand separators.

BACKGROUND OF THE INVENTION

To minimize costs and increase production, oil and natural gas producers use "pad" drilling techniques. This technique allows operators to drill groups of wells more efficiently since rig mobility reduces the time it takes to move from one well location to the next. A drilling pad is generally considered a location which houses the wellheads for a number of horizontally drilled wells. Currently, a drilling pad may have up to 10 wells.

As is well known to those skilled in the art, each producing well has associated with it processing equipment to deal with fluid production from the well. Invariably this processing equipment includes a desander or sand separator. Sand separators are basically vessels which can have internal structural features designed to separate gas from the slurry of heavy liquids and sand as well as other solids produced from the well. Sand separators must be periodically purged to remove the slurry from the well separator.

In the U.S. application Ser. No. 16/984,976 ('976 application), incorporated herein by reference for all purposes, there is disclosed a sand separator discharge system for automated purging of a sand separator. However, the system of the '976 application cannot be used for purging of multiple sand separators simultaneously because the separators fill at different rates and simultaneously dumping multiple sand separators through the single automated dump system of the '976 application creates problems leading to incorrect well test measurement results. However, providing a system of the '976 application type for each of multiple sand separators is cost prohibitive.

SUMMARY OF THE INVENTION

In one aspect, the present invention relates to a control system for managing the dump cycles of a plurality of sand separators.

In another aspect, the present invention relates to a control system for selectively purging multiple sand separators on an individually selected basis.

In still a further aspect, the present invention relates to a control system wherein a plurality of sand separators can be selectively dumped into a common discharge line.

In yet another aspect, the present invention relates to a control system for selectively dumping multiple sand separators wherein the system is configured to prevent simultaneous dumping of more than one of the multiple sand separators.

These and further features and advantages of the present invention will become apparent from the following detailed description, wherein reference is made to the figures in the accompanying drawings.

DETAILED DESCRIPTION OF PREFERRED EMBODIMENTS

Figure 1:
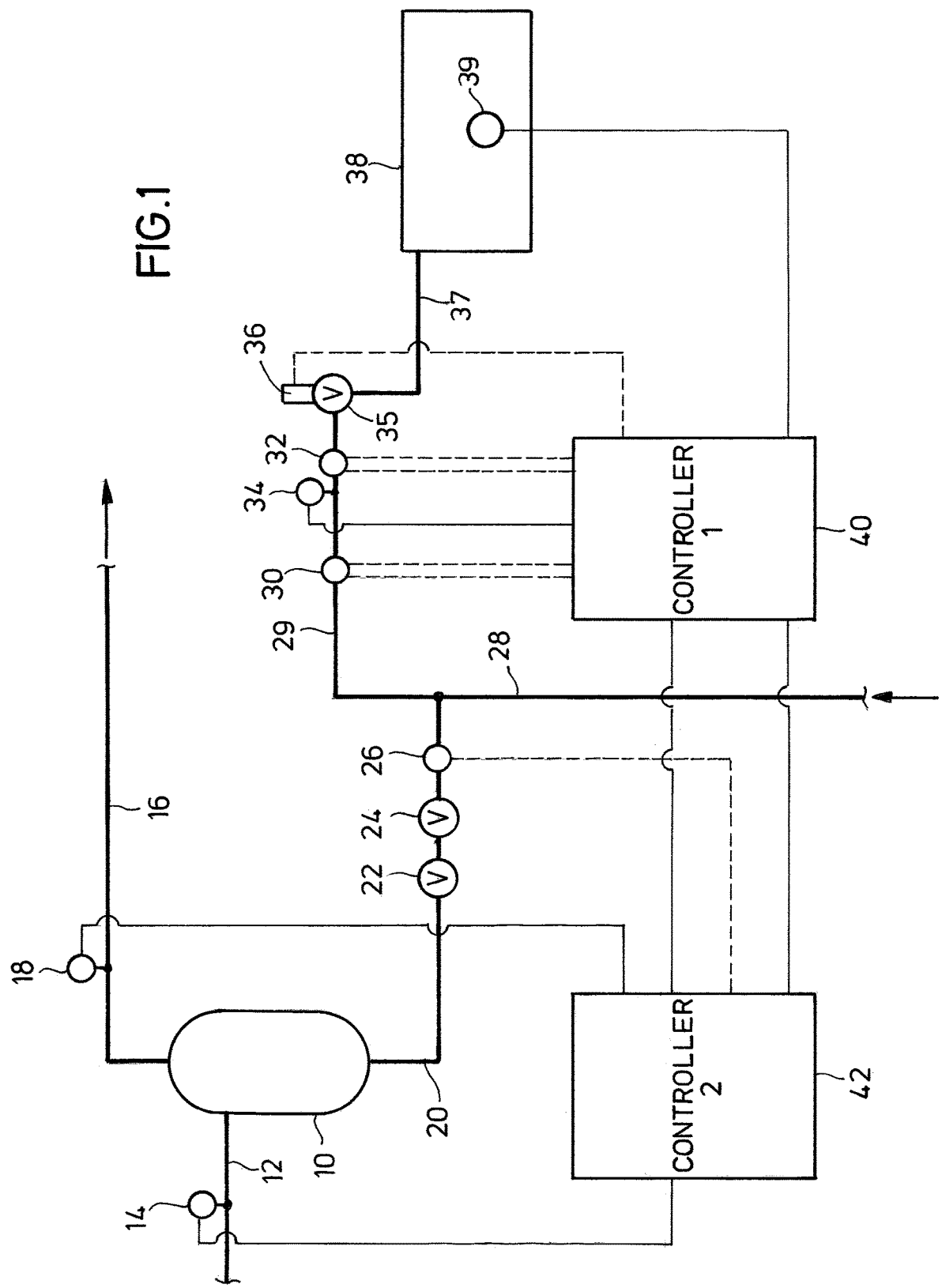
FIG. 1 is a schematic depiction of one embodiment of the control system according to the present invention.

Referring first to FIG. 1, there is shown a sand separator/desander 10 of conventional type to which is connected an inlet line 12 from a wellhead (not shown), there being a pressure transducer 14 to measure inlet pressure to sand separator 10. A light fraction comprised of gas and lighter liquids from the formation fluids passes as an overhead stream out of separator 10 through line 16 to sales or further processing, there being a pressure transducer 18 in line 16 to measure internal pressure in separator 10. Using the pressure measurements generated by transducers 14 and 18, the differential pressure across the sand separator 10 can be determined.

A slurry of sand, water, heavier liquids, etc. passes as a bottom stream out of vessel 10 into dump line 20 connected to separator 10. Connected inline in dump line 20 are first and second valves 22 and 24 which generally are gate valves. Downstream from valves 22 and 24 is an actuated valve 26, actuated valve 26 can comprise a plug valve operated by a hydraulic actuator (not shown). Dump line 20 is connected to a common discharge line 28 having a segment 29, plug valves 30 and 32 being connected inline in segment 29, a pressure transducer 34 being disposed between plug valves 30 and 32. Segment 29 of common discharge line 28 is connected to an on/off choke valve 34 actuated by an actuator 36 generally of a hydraulic type. A line 37 is connected to valve 34, line 37 emptying into a sand pit 38 which is at atmospheric pressure.

As can be seen, there is a controller 40 which is operatively, connected to valves 30 and 32, a transducer 34, actuator 36, and a level switch (39) in sand pit 38.

A controller 42 is electronically connected to transducers 14 and 18 as well as actuated valve assembly 26. Controller 42 is also connected to controller 40 in a master/servant relationship, controller 40 responding to signals from controller 42 as described hereafter. Controller 42 is configured to respond to various parameters to initiate a dump cycle from desander 10. Thus, and by way of example only, one of the parameters can be the differential pressure across desander 10 as determined by measurements from transducers 14 and 18. With this being a triggering event, controller 42 can open actuated valve 26 to allow slurry to flow into discharge line 28. However, immediately after or on opening of valve 26, controller 42 signals controller 40 to open discharge valve 36 and the slurry from desander 10 then flows through the system into sand pit 38. Following the dump cycle, controller 40 then conducts integrity checks of valves 30 and 32 and determines via transducer 34 the pressure in line 29.

Figure 2:
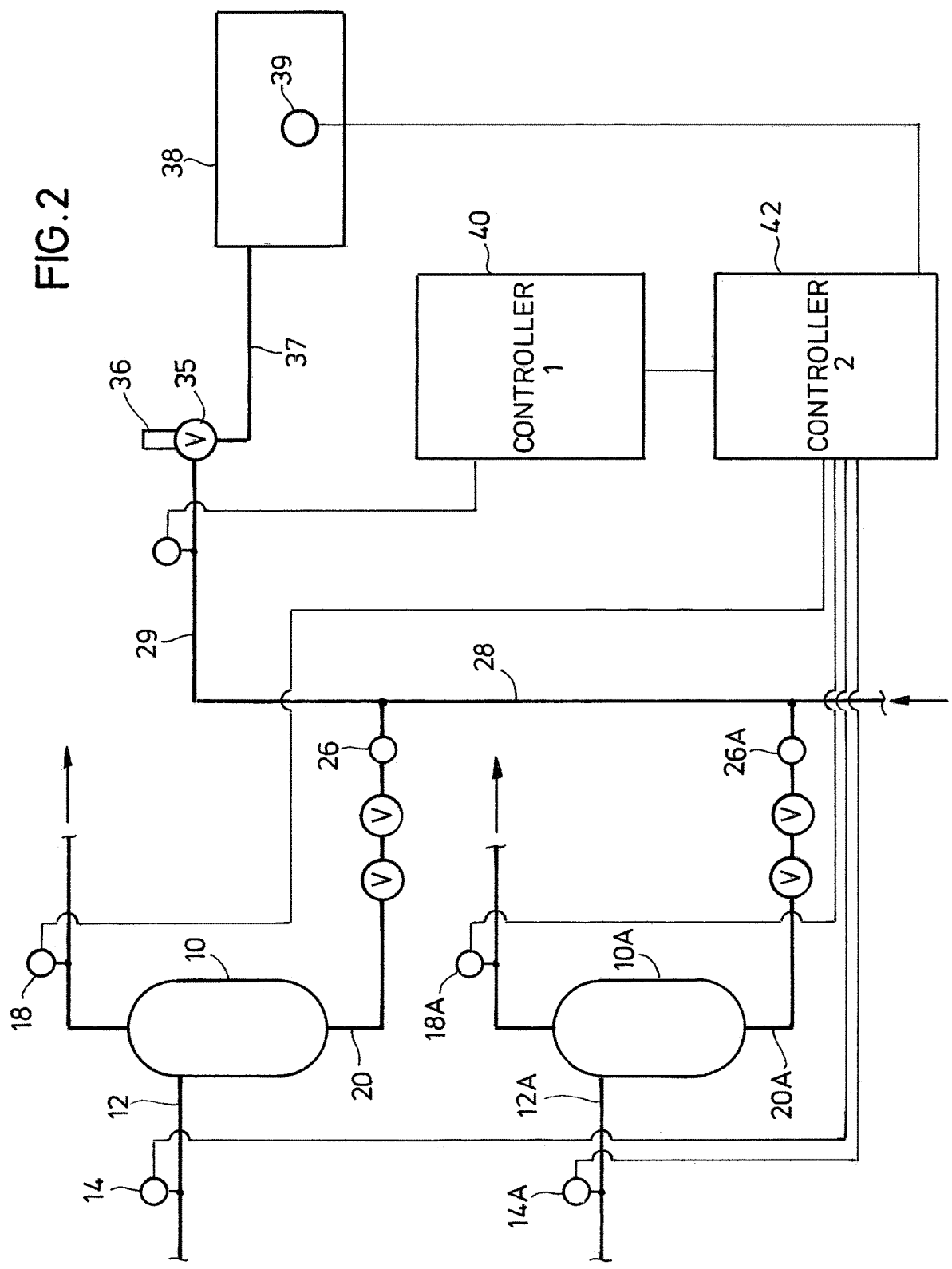
FIG. 2 is a view similar to FIG. 1 and depicts multiple sand separators connected to the control system of the present invention.

Turning now to FIG. 2, there are shown two sand separators 10 and 10A, sand separator 10A having associated transducers 14A and 18A as well as actuated valve 26A controlling flow from dump line 20A into discharge line 28. As is indicated in FIG. 2, there can be additional sand separators, all of which have a similar configuration to sand separators 10 and 10A and all of which can dump into discharge line 28 and hence lines 29 and 37 into sand pit 38.

In the description above with respect to sand separator 10, it was noted that a triggering event to start the dump cycle can be the differential pressure across separator 10 as determined by transducers 14 and 18. Other parameters can be used as triggering events. Thus, a triggering event can simply be elapsed time in the separator to be dumped, inlet pressure to the separator to be dumped, a "high" pressure as determined by transducer 14, slurry level in the sand separator to be dumped, internal pressure in the sand separator, as well as other triggering events.

As can be seen from the drawings and the description above, the valves, transducers, etc. are all connected to one of controllers 40 or 42 and can be controlled thereby. It will also be appreciated that all of the desanders are monitored by controller 40, controller 40 having a microprocessor which can determine the status of each of the sand separators and, more importantly, decide which sand separator to dump, the microprocessor being configured to prevent two of the sand separators from being dumped simultaneously.

While the controllers 40 and 42 are depicted and described with respect to two separate systems, it is to be understood that there can be an integrated control system combining both controllers 40 and 42 into a single, master controller which can control the operation of the sand separators and, more specifically, when a selected sand separator is dumped. Again, in order to avoid problems that can arise if two or more sand separators were dumped at the same time, controller 42 is configured to monitor the conditions in all of the sand separators connected to the system and determine which sand separator should be dumped and when. In other words, the master control system ensures that only one of the sand separators is dumped at any given time.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A system for controlling sand discharge from a plurality of wells, comprising:
    an actuated valve assembly in each dump line of a sand separator in a plurality of sand separators arranged in parallel, each sand separator being connected with a separate well;
    a first controller, each of said actuated valve assemblies being operatively connected to said first controller, said first controller being configured to selectively signal one of said actuated valve assemblies to open in response to a parameter comprising one of internal pressure in said sand separator, elapsed residence time of slurry in said separator, inlet pressure to said sand separator, and a combination of said parameters;
    a discharge train, said discharge train comprising:
        (i) a common discharge line for receiving a sand output discharged from said dump lines;
        (ii) a single discharge valve in said common discharge line, and
    a second controller operatively connected to said first controller and said discharge valve in said discharge line, whereby upon or just after the opening of a selected one of said actuated valve assemblies, said second controller opens said discharge valve in said discharge line, and wherein said first controller is configured to open only one of said actuated valve assemblies at a time based on said parameters whereby only the sand output from a single unit passes through said discharge train at a time.

2. The system of claim 1, wherein said first and second controllers are integrated into a master control system.

3. The system of claim 1, wherein there is an inlet line into said separator and a pressure transducer in said inlet line.

4. The system of claim 3, wherein there is an overhead discharge line from said separator and there is a second pressure transducer in said overhead discharge line.

5. The system of claim 1, wherein there are first and second valves in said discharge line, and a pressure transducer in said discharge line between said first and second valves.

6. The system of claim 5, wherein said first and second valves are plug valves.

7. The system of claim 1, wherein said single discharge valve is an on/off choke valve.

8. The system of claim 7, wherein said choke valve is controlled by an actuator, said actuator being operatively connected to said second controller.

* * * * *